United States Patent [19]

Vella

[11] Patent Number: 4,468,407

[45] Date of Patent: Aug. 28, 1984

[54] PROCESS FOR THE REDUCTION OF ALCOHOL CONTENT OF BEVERAGES

[75] Inventor: Peter J. Vella, Modesto, Calif.

[73] Assignee: E. & J. Gallo Winery, Modesto, Calif.

[21] Appl. No.: 405,494

[22] Filed: Aug. 5, 1982

[51] Int. Cl.$^3$ .............................................. C12G 3/08
[52] U.S. Cl. .................................... 426/592; 426/384; 426/490; 426/804; 426/14
[58] Field of Search ............... 426/592, 384, 490, 524, 426/14, 804; 62/532, 543, 545

[56] References Cited

U.S. PATENT DOCUMENTS

| | | | |
|---|---|---|---|
| 3,285,022 | 11/1966 | Pike | 62/58 |
| 3,285,025 | 11/1966 | Shaul | 426/384 |
| 3,404,006 | 6/1969 | Malick | 99/35 |
| 3,404,012 | 10/1968 | Craig . | |
| 4,265,920 | 5/1981 | Thijssen | 426/384 |

FOREIGN PATENT DOCUMENTS

770563  3/1934  France .

OTHER PUBLICATIONS

Webb, A. Dinsmoor, "Wine Flavor: Volatile Aroma Compounds of Wines", *Symposium on Foods: The Chemistry and Physiology of Flavors,* Schultz ed., AVI Pub. Co., 1967, pp. 203–227.
*Wine Press,* vol. 1, No. 8, Farmer's Warehouse Liquors Pub. 4/5 1982 1st, last and two unnumbered pages.
*Food Chemical News,* 9/7/81, p. 27.
*Chemical and Engineering News,* Oct. 16, 1961, p. 25.

*Primary Examiner*—Raymond Jones
*Assistant Examiner*—Elizabeth J. Curtin
*Attorney, Agent, or Firm*—Townsend and Townsend

[57] ABSTRACT

A process for the manufacture of alcoholic beverages of low alcohol content is disclosed, wherein a standard alcoholic beverage is chilled to form crystals, which are then consolidated into a substantially solid mass. The mass is then recovered, thawed, and optionally blended with either the unfrozen portion of the starting beverage or with a further quantity of the standard beverage itself to produce a low alcohol counterpart which retains substantially all of the flavor and taste of the standard beverage.

4 Claims, No Drawings

PROCESS FOR THE REDUCTION OF ALCOHOL CONTENT OF BEVERAGES

BACKGROUND OF THE INVENTION

The present invention relates to a process for the production of low-alcohol, and hence low-calorie, counterparts of common alcoholic beverages. The invention is useful in providing low-calorie alternatives which retain substantially all of the taste and flavor of their common higher alcohol counterparts.

1. Field of the Invention

The public interest in maintaining physical fitness, an attractive appearance and general good health has given impetus to the development of a large variety of low-calorie foods and beverages. This development has recently spread to alcoholic beverages, resulting in the proliferatin of low calorie (or "light") alcoholic beverages, particularly beers and wines. The calorie reduction of these beverages is achieved by a reduction in the alcohol content. The desirable low-alcohol beverage, however, will retain the taste of its high-alcohol counterpart, making it an effective and desirable substitute for the latter.

2. Description of the Prior Art

Light wines are an illustrative example of alcoholic beverages in which a low calorie content is achieved by reduction in the alcohol level. Two methods have been developed for the production of light wines.

According to the first method, grapes are harvested before they are fully ripe. A typical sugar level of such grapes is 16 degrees Brix, rather than the 22–23 degrees Brix level of ripe grapes. Fermentation of these low-sugar grapes produces a low-alcohol product. Unfortunately, the acidity and varietal flavor of such a product differs significantly from that derived from ripe grapes. The result is a product with substantially lower flavor and higher acidity than standard wines. These are serious drawbacks to the development of an effective low-calorie substitute for standard wines. The problem is only partially overcome by blending the product with quantities of standard wine.

In the second method, a standard alcohol wine is distilled to remove a portion of its alcohol content. To avoid high temperatures, distillation is accomplished in a thin film evaporator or a vacuum flash pan. Unfortunately, a certain amount of heat is needed to volatilize the alcohol, and chemical changes in the wine itself are inevitable. This usually results in a loss of flavor or the development of undesirable flavors not present in the starting standard wine.

SUMMARY OF THE INVENTION

It has now been discovered that alcoholic beverages of low alcohol content can be prepared by the partial freezing of standard alcoholic beverages in a novel process which avoids the above-cited disadvantages. The process retains substantially all of the taste and flavor of the standard beverage, and provides a satisfactory and pleasing alternative to beverages of high alcohol content.

DESCRIPTION OF THE PREFERRED EMBODIMENTS

The present invention resides in the fractional crystallization of an alcoholic beverage, the separation of the partially crystallized material into a liquid and a substantially solid fraction and the thawing of the solid fraction. The process is applicable to any common alcoholic beverage, including wines, beers, whiskeys, etc., and produces a low-alcohol counterpart which retains substantially all of the taste and flavor of the starting beverage. The invention is preferably directed toward alcoholic fermented juices of plant materials containing sugars, particularly wines, ranging from about 9% to about 24% alcohol (volume basis). The most preferred starting materials are table wines with about 10% to about 14% alcohol, prepared by any conventional process of fermentation.

In the first step of the process, the beverage is chilled sufficiently for crystallization to occur. The actual chilling temperature is not critical and can vary over a wide range. It will be most convenient, however, to crystallize the beverage within a temperature range in which only a portion of the entire beverage will freeze. This range will depend on the alcohol content of the starting material, with higher alcohol contents permitting lower temperatures. For practical operation of the process, particularly when applied to table wines, the temperature will preferably lie within the range of about 0° F. to about 30° F. (about $-18°$ C. to about $-1°$ C.), most preferably from about 15° F. to about 25° F. (from about $-10°$ C. to about $-4°$ C.).

The pressure under which crystallization is performed is likewise non-critical. A pressure approximating atmospheric pressure is the most practical and convenient.

Crystallization can be accomplished by any conventional means, either in a batch-type process, a continuous-type process or a combination. For commercial scale operation, continuous or continuous/batch processes are generally preferred for reasons of economy and reproducibility. In such processes, the preferred crystallization technique is the formation of an ice slurry, which promotes ease of transfer through pumps and conduits. A slurry can be formed by any conventional indirect heat exchanger, illustrative of which are rotating drums, shell and bayonet types and scraped surface types. The latter is the most preferred. With continuous equipment, a residence time on the order of a few seconds will generally suffice.

Once crystallization has occurred, the crystals are consolidated into a substantially solid mass. Formation of the mass will either cause a small amount of liquid to be retained within the mass, cause dissolved matter from the liquid phase to be occluded by the crystals, or both. This can be accomplished in several ways. As one example, the head pressure in a static or semi-static tank can be used to form a floating ice cap. The tank can be fed by a slurry formed in a continuous crystallizer (an example of a batch/continuous process), or crystallization can occur within the tank itself (a batch process). In either case, the floating ice cap is readily separated from the remaining liquid by simple removal from the tank. As a further example, mechanical pressure can be applied to a crystal slurry to form either a solid mass or a slurry with a relatively high crystal content within the fluid body. The solid mass or concentrated slurry can then be removed from the remaining liquid on a continuous flow basis, providing a fully continuous process. Other examples will be readily apparent to those skilled in the art.

Once the solid or substantially solid mass is separated from the remaining liquid, the mass is thawed to form a homogeneous liquid solution. The temperature and rate of thawing are not critical, and can vary over a wide range provided no chemical changes are induced in any of the components present in the mass. For convenience and the preservation of taste and flavor, thawing is preferably done under ambient conditions of temperature and pressure.

Depending upon the particular alcoholic beverage to which the process of the present invention is applied, it is often preferable to blend the final product with either a portion of the high-alcohol liquid from which the solid mass was removed or with an amount of the starting material. This is particularly preferred in the case of wines, where the final product must have an alcohol content in excess of 7 volume percent to meet the standards of the Bureau of Alcohol, Tobacco, and Firearms of the United States Treasury (BATF). Blending is easily accomplished by selecting relative proportions to achieve the desired volume percent alcohol. The preferred final product has an alcohol content of from about 7.0% to about 9.5% (volume basis). When the fractions are so blended, the result is a beverage of low alcohol content (and hence low calorie content) which yet retains substantially all of the taste and flavor of the starting beverage, with no new flavors due to chemical changes occurring during the removal of the alcohol.

The foregoing description and the following examples are offered for illustrative purposes only, and are intended neither to limit nor define the invention. Numerous modifications and variations will be readily apparent to those skilled in the art, while still falling within the spirit and scope of the invention as claimed hereinbelow.

EXAMPLE 1

Six liters of Valley White, a mixture of white varietal wines supplied by E & J. Gallo Winery, Modesto, Calif., with an alcohol content of 12.75 volume percent, total acidity of 0.7 g/100ml (calculated as tartaric acid), total sulfur dioxide content of 130 mg/liter and pH 3.4, were divided into aliquots of 500 ml each, then cooled to a temperature of −20° C. and held at this temperature overnight. A slurry formed in each aliquot.

The slurries were then transferred to a laboratory Carver Press, where pressure was applied until an ice block formed. Each ice block was then separated from the remaining liquid, and permitted to thaw at 20° C. (68° F.). The fractions from each aliquot were than combined and analyzed to give the following results:

| Fraction | Volume (ml) | Alcohol (Volume %) | Acidity (g/100 ml) |
| --- | --- | --- | --- |
| Thawed ice blocks | 2700 | 2.4 | 0.14 |
| Unfrozen portion | 3230 | 20.5 | 1.16 |

The total volume of both fractions reflects a loss of 70ml of the original wine during the process and analysis steps.

The two fractions were then blended to provide a mixture containing approximately 8.3% alcohol. The pH was then adjusted to 3.2 by hydrogen ion exchange using Amberlite ® IR-120 sulfonated polystyrene ion exchange resin (product of Rohm and Haas Co., Philadelphia, Pa.); treated with 0.015 g/l Darco ® KB activated carbon (product of ICI United States, Inc., Wilmington, Del.); and sweetened to 1.0 g/100ml reducing sugar by the addition of 5% (volume basis) white juice. All such treatments were performed according to procedures approved by the BATF.

The final product analyzed as follows: alcohol content 7.9% (volume basis), acidity 0.60 g/100ml, reducing sugar content 1.1 g/100ml, pH 3.1. The product was then compared by organoleptic evaluation to six commercial "light" white wines which were produced either from unripened grapes or from distillation or a combination of the two. The comparison showed the product to be superior in both mouthfeel and varietal flavor. In each of the commercial products, by contrast, a cooked flavor or bitterness was detected, neither of which were present in the product of this example.

EXAMPLE 2

Eight liters of a Rhine Base wine supplied by E. & J. Gallo Winery, with an alcohol content of 10.0% (volume basis), acidity of 0.76 g/100ml, sulfur dioxide content of 110 mg/liter and pH 3.15, were divided into aliquots, cooled, separated into ice and liquid fractions and thawed as in Example 1. The combined fractions were analyzed to give the following results:

| Fraction | Volume (ml) | Alcohol (Volume %) | Acidity (g/100 ml) |
| --- | --- | --- | --- |
| Thawed ice blocks | 3660 | 1.5 | 0.13 |
| Unfrozen portion | 4215 | 19.2 | 1.42 |

The fractions were blended to 8.3% alcohol and the blend was processed as in Example 1. The final product was analyzed to give the following results: alcohol content 7.95% (volume basis), acidity 0.63 g/100ml, reducing sugar content 1.2 g/100ml, pH 3.1. An organoleptic comparison was performed as an Example 1, and the product was found to be superior in both mouthfeel and flavor to commercial light wines as was the product of Example 1.

What is claimed is:

1. A process for producing wine containing from about 7.0% to about 9.5% alcohol by volume which comprises
   (a) chilling a standard wine containing from about 10% to about 14% alcohol by volume to a temperature of from about 0° F. to about 30° F. to convert a substantial portion thereof to crystals,
   (b) consolidating said crystals into a substantially solid mass within a high-alcohol liquid fraction,
   (c) separating said solid mass from said high-alcohol liquid fraction,
   (d) thawing said solid mass under approximately ambient conditions to form a low-alcohol wine fraction,
   (e) combining said low-alcohol fraction with either a portion of sia high-alcohol fraction or a further quantity of said standard wine, in volumes of relative size selected to produce a blend containing from about 7.0% to about 9.5% alcohol by volume.

2. A process according to claim 1 in which step (a) is performed at a temperature from about 15° F. to about 25° F.

3. A process according to claim 1 in which step (a) is performed in a scraped surface heat exchanger.

4. A process according to claim 1 in which step (b) occurs through the action of the head pressure of said crystals in a static or semi-static vessel.

* * * * *